United States Patent [19]

Lam

[11] Patent Number: 4,827,300

[45] Date of Patent: May 2, 1989

[54] OPTICAL DETECTOR FOR AN AUTO-FOCUS CAMERA

[75] Inventor: Chiu K. Lam, North Point, Hong Kong

[73] Assignee: Famous Instrument Limited, Hong Kong

[21] Appl. No.: 149,397

[22] Filed: Jan. 28, 1988

[30] Foreign Application Priority Data

Jan. 28, 1987 [GB] United Kingdom ............... 8701905

[51] Int. Cl.⁴ .............................................. G03B 3/00
[52] U.S. Cl. .................... 354/402; 354/403; 354/482
[58] Field of Search ........... 354/403, 459, 437, 471, 354/482

[56] References Cited

U.S. PATENT DOCUMENTS

| | | | |
|---|---|---|---|
| 3,528,350 | 9/1970 | Schmitt | 354/459 |
| 3,860,936 | 1/1975 | Harvey | 354/471 |
| 4,001,845 | 1/1977 | Maitani et al. | 354/459 |
| 4,143,954 | 3/1979 | Numata et al. | 354/471 |
| 4,146,319 | 3/1979 | Numata et al. | 354/471 |
| 4,156,564 | 5/1979 | Tsunekawa et al. | 354/482 |
| 4,255,031 | 3/1981 | Johnson et al. | 354/437 |
| 4,293,208 | 10/1981 | Bagdis | 354/437 |
| 4,385,817 | 5/1983 | Saito | 354/403 |
| 4,444,477 | 4/1984 | Tamura | 354/403 |

FOREIGN PATENT DOCUMENTS 1401699 11/1972 United Kingdom.
1595458 11/1977 United Kingdom.

Primary Examiner—Russell E. Adams
Attorney, Agent, or Firm—Majestic, Parsons, Siebert & Hsue

[57] ABSTRACT

In an auto-focus system for a camera, a beam of infrared light from the camera is reflected by the subject and detected by a detector 5, the balance or strength of illumination across the detector 5 indicating the distance of the subject relative to the lens 2. A light source is provided to illuminate directly the detector to bias it into a preferred operating range of illumination.

11 Claims, 4 Drawing Sheets

OPTICAL DETECTOR FOR AN AUTO-FOCUS CAMERA

INTRODUCTION

The present invention relates to auto-focus cameras incorporating an optical detector to enable the picture lens to focus on a subject, and more particularly to the provision of an improved detector system for such cameras. The invention is particularly applicable to 35 mm compact cameras.

BACKGROUND

In some auto-focus cameras the focussing system operates by directing a beam of light, usually a pulsed beam of infra-red light, onto the subject and sensing the reflected light through a detector lens. The light is usually sensed by a detector comprising a photo-transistor, photo-diode or photo-darlington or an array of such devices. The balance across the detector array or the strength of the reflected light from the subject reaching the detector depends on the distance of the subject from the detecting lens. The differential output or the amplitude of the output from the detector can then be used to control the focusing of the picture lens. Such systems are well known in the art.

A difficulty with such systems is that the detector must work in widely varying degrees of overall illumination, from moonlight to bright sunshine, where the strength of the light may vary by a factor of 1 million. In low light conditions the detector becomes slow to react to changes in illumination and the output signal is low, reducing the sensitivity of the system.

SUMMARY OF THE INVENTION

The present invention provides an auto-focus camera having a light sensitive detector arranged to receive light from a subject through a lens to give an electrical output indicative of the distance of the subject from the camera, wherein the camera has a light source which provides a minimum background level of illumination of the detector.

The background level of illumination provided by the light source serves to bias the detector into a preferred operating range so that it may work more efficiently even when there is only a low level of ambient light from the subject.

Other preferred features and the advantages of the invention will be apparent from the following description and the accompanying claims.

DESCRIPTION OF THE PREFERRED EMBODIMENT

Figure 1:
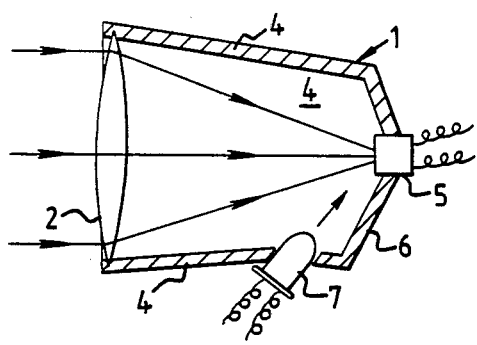
FIG. 1 in cross-sectional view a light detecting system of an auto-focus camera according to the invention.

FIG. 1 of the drawings illustrates a known form of light detecting system used in the auto-focus system of a compact 35 mm camera, which has been modified in accordance with the invention.

The system comprises a housing 1 which has opaque side and back walls 4, 6 and is closed at a front end by a detecting lens 2. A light detector 5 sensitive to infra-red light, such as a photo-diode, photo-transistor or photo-darlington, or an array of such devices, is mounted in a rear wall 6 of the housing approximately at the focal point of the lens and is illuminated by light passing through the lens, generally along the optical axis of the lens. Typically, the subject is illuminated by a pulsed beam of infra-red light emitted from the camera (vide hereinafter), infra-red light reflected by the subject being detected by the detecting system.

When the detector is illuminated it produces an electrical signal which is fed to electronic circuitry in the camera.

The detector is configured so that the signal output from the detector is indicative of the balance or strength of the illumination of the detector by the reflected infra-red light, which in turn depends on the position of the subject relative to source of the infra-red light and the lens 2. Hence the output signal is used by a control circuit to control the focussing of the picture taking lens.

Such systems and their mode of operation are well known in the art and need not be described in detail here.

The improvement of the invention provides in the housing 1 a light source 7 which illuminates the detector 5 directly to provide a minimum background level of illumination. In the example shown, the light source is an infra-red light emitting diode. The source 7 is driven to illuminate the detector 5 to an extent equivalent to medium or low-medium ambient light conditions. The source 7 is powered by the on-board camera power supply. The current required to drive the source 7 at this level of illumination is quite small because of its proximity to the detector and so the source may be left on constantly whilst the camera is in use. The source 7 is DC driven, providing a substantially constant background illumination which will not interfere with the signal produced from the detector 5 when sensing the pulsed infra-red light reflected from the subject.

The source 7 is positioned low in the housing 1, away from the optical axis of the lens 2 to avoid interfering with the reflected light passing through the lens.

The arrangement thus enables the detector to be biassed into a more efficient operating range.

The source 7 may be driven in a negative feed-back loop circuit driven by the output from the detector 5, to turn the source off when the ambient light is high. For general applications in compact cameras this is felt to be unnecessarily complicated as the current drawn by the source 7 is low. However, the method may be used to maintain the sensor at a constant background illumination for more sophisticated applications. A band filter will be used in the control loop circuit to pick out from the detector 5 the pulsed signal arising from the reflected pulsed infra red beam.

The light source 7 may be a single LED or an array of sources may be provided, corresponding to an array of the detectors 5. However for most applications a single LED will provide sufficient illumination for a single detector 5 or an array of detectors.

Figure 4:
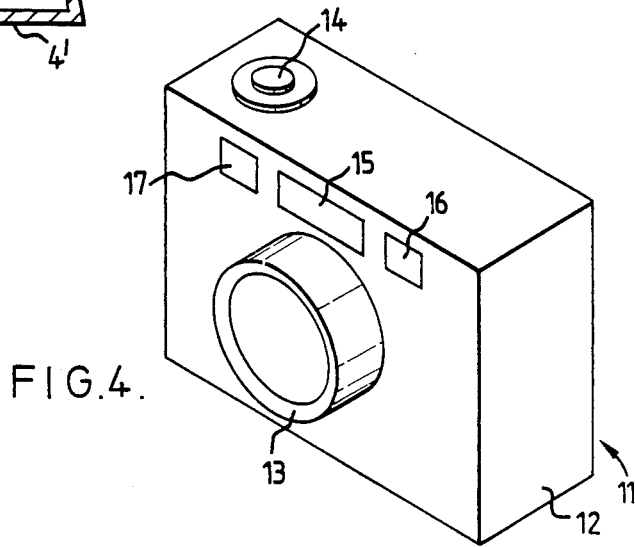
FIG. 4 is a schematic perspective view of a compact 35 mm auto-focus camera embodying the invention.

FIG. 4 shows schematically a 35 mm camera 11 of the compact type employing an auto-focus system of the present invention. The arrangement of such cameras is well known in the art and as shown in FIG. 4, typically comprises a body 12 carrying a lens 13. The body houses electronic circuitry and an electromechanical drive for focussing the lens. Such lenses are designed so that a large change in focussing distance is achieved by a small movement of the lens. A view finder 15 for viewing the subject and a push-button 14 for operating the camera are provided. The auto-focus system comprises an infra-red light source (not shown) positioned behind a window 16 and the detector of FIG. 1 positioned behind a window 17. An on-board battery power supply is housed in the camera body 12. When the power switch of the camera (not shown) is turned on, the light source 7 in the detector housing is turned on. In operation, as the push-button 14 is depressed halfway down, the infra-red light source behind window 16 is turned on. The lens 13 is then focussed automatically. The button 14 is then depressed further down to activate the camera shutter mechanism (not shown) as is well known in the art.

DESCRIPTION OF OTHER EMBODIMENTS

Figure 2:
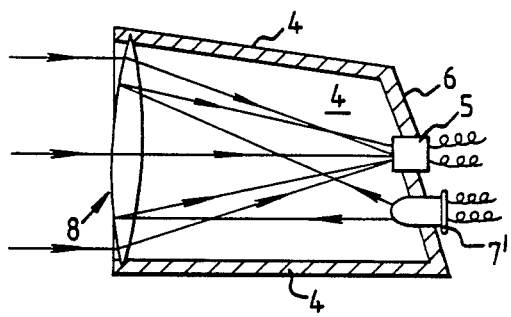
FIGS. 2 and 3 show modifications of the embodiment of FIG. 1.

FIG. 2 shows a modification of the embodiment of FIG. 1 in which the light source 7' is positioned to the rear of the detector 5 relative to the lens 2'. The lens has a semi-reflecting coating on its far surface 8, relative to the light source. The coating reflects light from the source 7' on to the detector 5 whilst allowing light from the subject to pass through the lens 2' to the detector 5.

Figure 3:
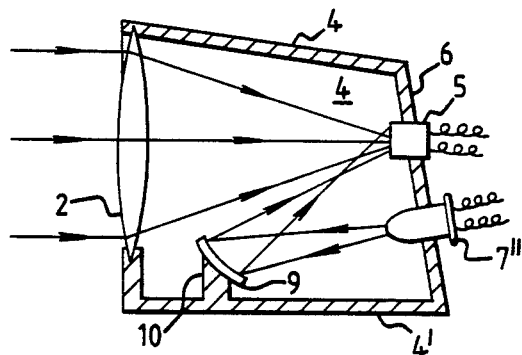

FIG. 3 shows another modification of the embodiment of FIG. 1, in which the light from the source 7'' is reflected on to the detector 5 by a concave mirror 9 mounted on a pillar 10 which is integrally formed with the lower housing wall 4.

Various modifications may be made to the described embodiments and it is desired to include all such modifications as fall within the scope of the accompanying claims. For example the invention may be applied to systems where the or a like detector 5 is mounted behind the picture taking lens.

What is claimed is:

1. An auto-focus camera having an infra-red light-sensitive detector arranged to receive through a lens infra-red light reflected from a subject to give an electrical output indicative of the distance of the subject from the camera, wherein the camera has an infra-red background illumination light source which provides a minimum background level of infra-red illumination of the detector to bias the detector into a preferred operating range.

2. A camera as claimed in claim 1, wherein the background illumination light source is positioned between the detector and the lens to illuminate the detector directly.

3. A camera as claimed in claim 1, wherein light from the background illumination light source is reflected onto the detector.

4. A camera as claimed in claim 3, wherein the source is positioned adjacent or to the rear of the detector relative to the lens.

5. A camera as claimed in claim 4, wherein the light illuminating the detector is reflected by a mirror provided in the detector housing.

6. A camera as claimed in claim 4, wherein the detector lens has a semi-reflective coating on a surface thereof and light from the source is reflected by the coated lens surface on to the detector.

7. A camera as claimed in claim 1, wherein the light source is powered substantially continuously when the detector is functioning.

8. A camera as claimed in claim 1, wherein the light source is powered in low ambient light conditions only, to bring the ambient light seen by the detector up to a medium level of illumination.

9. A camera as claimed in claim 1, wherein the light source is powered to provide a substantially constant background level of illumination of the detector.

10. An auto-focus camera having a focussing system comprising a first light source for illuminating a subject, a housing closed at one end by a detecting lens and supporting a light sensitive detector at another end of the housing opposite the said one end, the detector being illuminated by light from the source which is reflected from the subject and passes through the detecting lens generally along the optical axis of the lens, the detector producing an electrical signal indicative of the distance of the subject from the lens, a control circuit for monitoring the signal and producing a control signal for focussing a picture taking lens of the camera, focussing means for focussing the picture taking lens in accordance with the control signal, and a second light source in the housing for illuminating the detector to bias the detector into a preferred operating range wherein the first and second light sources are infra-red light sources.

11. A compact 35 mm auto-focus camera having an on-board power supply, a picture taking lens, focussing means for focussing the picture taking lens, said focussing means comprising an infra-red light source for illuminating a subject, a detector for detecting infra-red light from the infra-red light source reflected by the subject and producing an electrical signal indicative of the distance of the subject from the camera, and means for moving the lens in response to the electrical signal to focus the lens on the subject, wherein a source of infra-red light is provided for illuminating the detector to bias it into a preferred operating range.

* * * * *